C. E. STEERE.
FRUIT AND VEGETABLE PULPING MACHINE.
APPLICATION FILED FEB. 21, 1917.
1,349,739.
Patented Aug. 17, 1920.
3 SHEETS—SHEET 1.
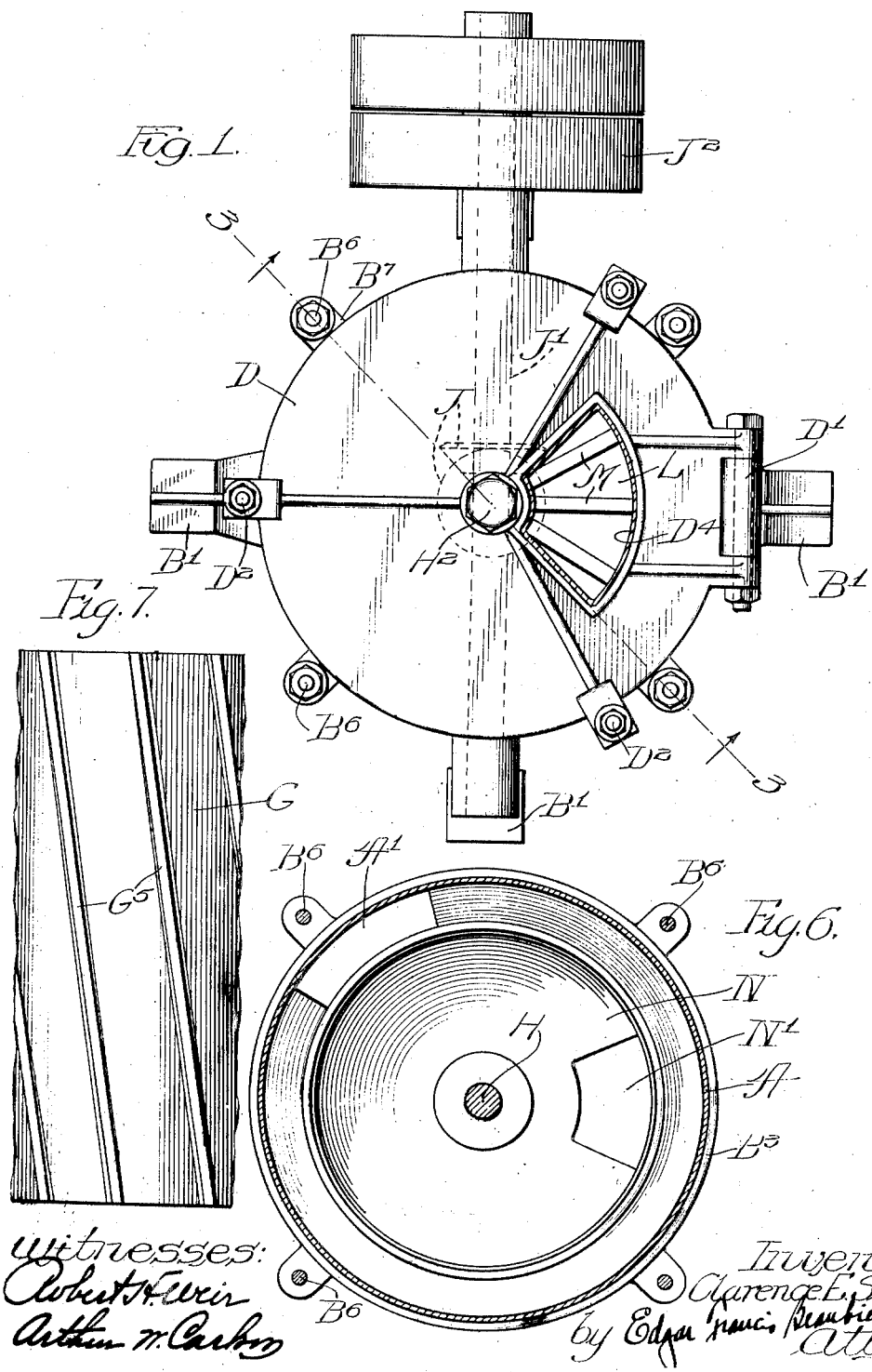

C. E. STEERE.
FRUIT AND VEGETABLE PULPING MACHINE.
APPLICATION FILED FEB. 21, 1917.
1,349,739.
Patented Aug. 17, 1920.
3 SHEETS—SHEET 2.
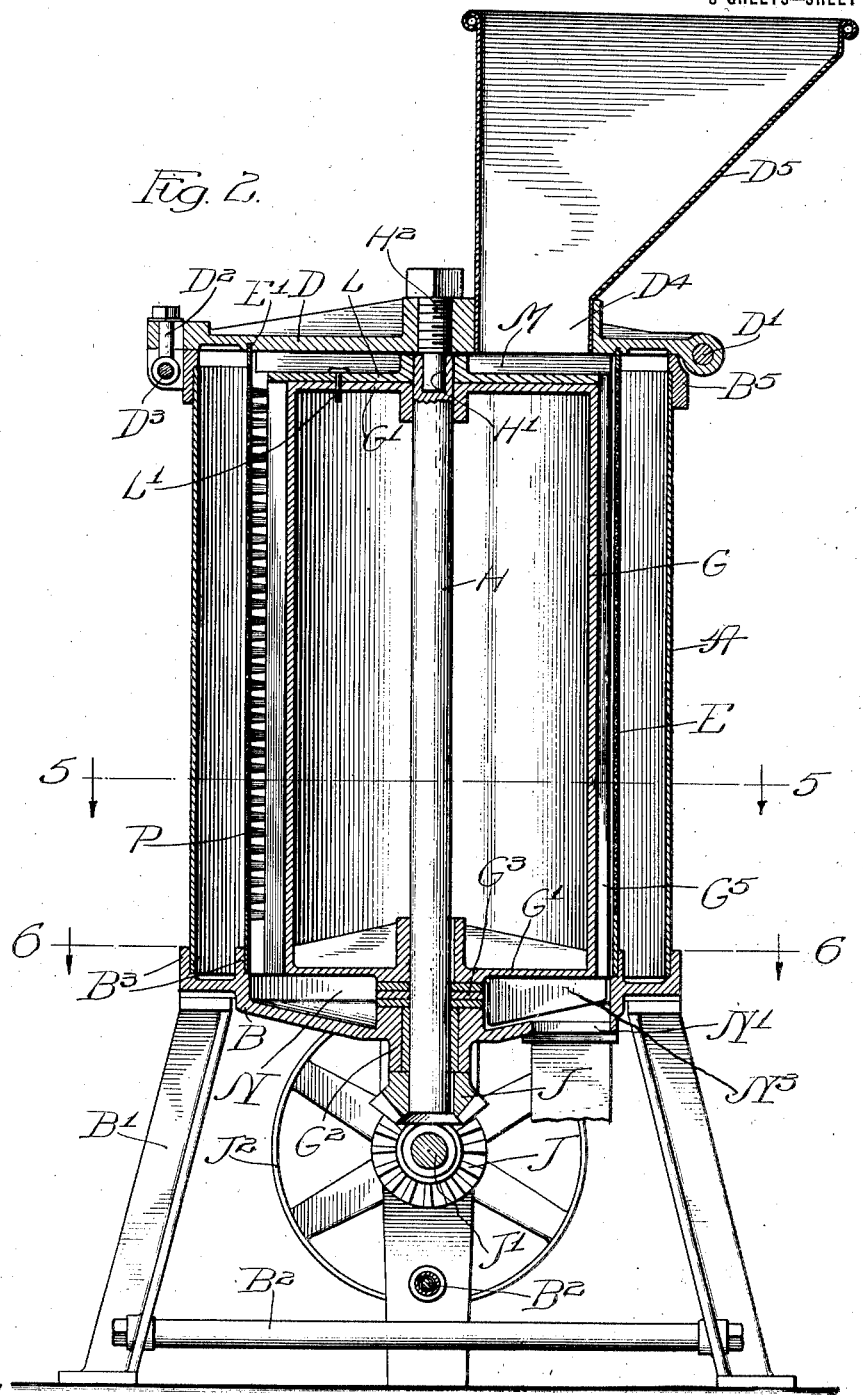

C. E. STEERE.
FRUIT AND VEGETABLE PULPING MACHINE.
APPLICATION FILED FEB. 21, 1917.
1,349,739.
Patented Aug. 17, 1920.
3 SHEETS—SHEET 3.
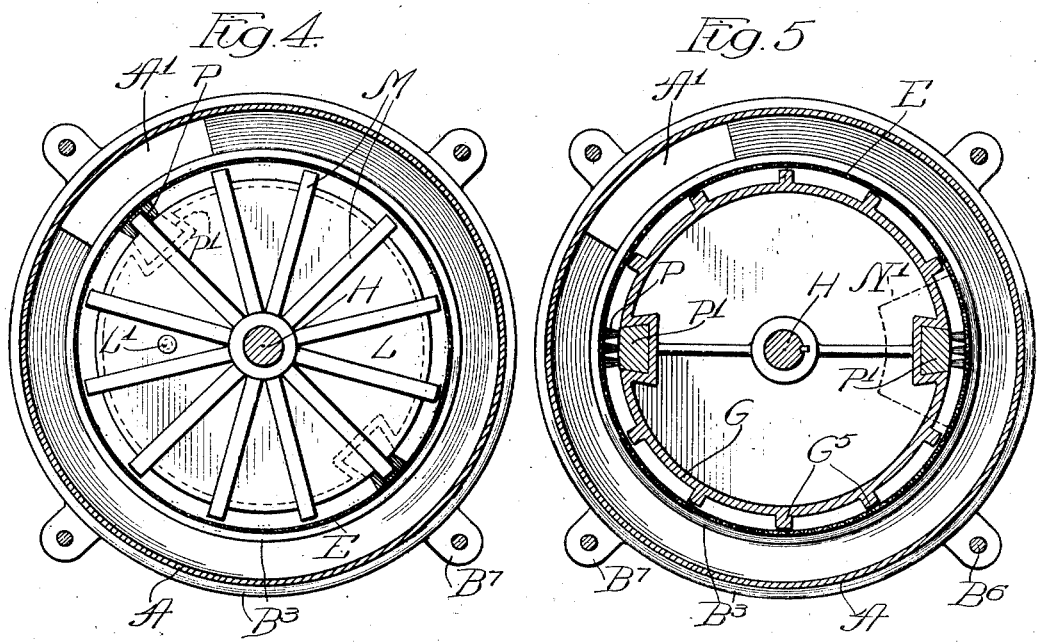
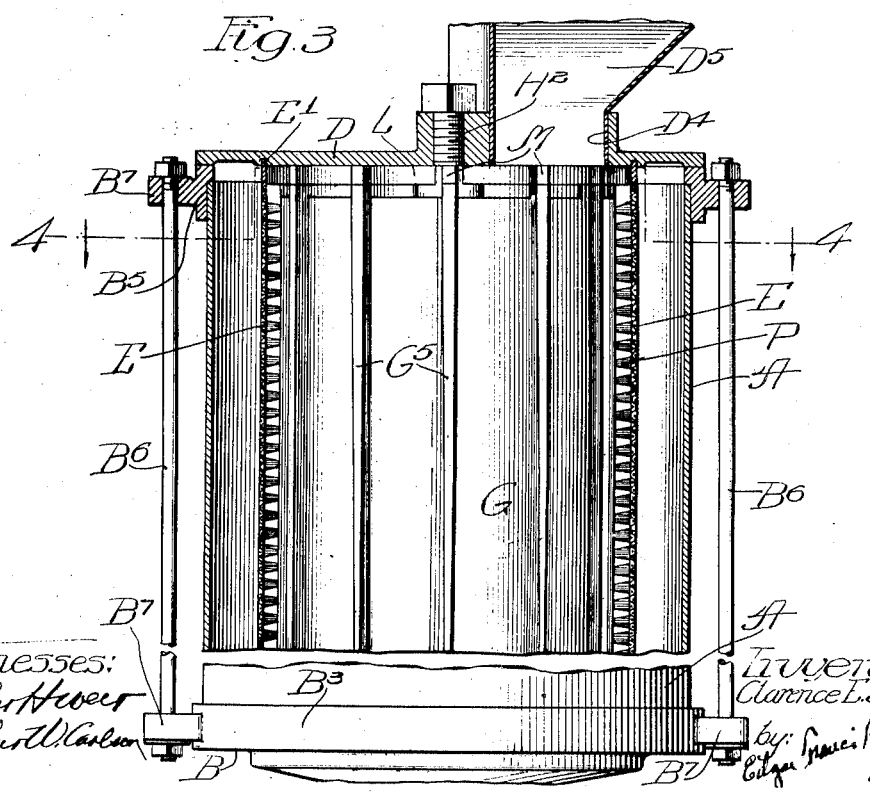

UNITED STATES PATENT OFFICE.

CLARENCE E. STEERE, OF MILWAUKEE, WISCONSIN, ASSIGNOR TO HENRY SCARBOROUGH, OF MILWAUKEE, WISCONSIN.

FRUIT AND VEGETABLE PULPING MACHINE.

1,349,739.     Specification of Letters Patent.     Patented Aug. 17, 1920.

Application filed February 21, 1917. Serial No. 149,991.

*To all whom it may concern:*

Be it known that I, CLARENCE E. STEERE, a citizen of the United States of America, and resident of Milwaukee, Milwaukee county, Wisconsin, have invented a certain new and useful Improvement in Fruit and Vegetable Pulping Machines, of which the following is a specification.

My invention relates to an improved fruit and vegetable pulping machine, and the object of my invention is to provide a machine of this character which will be simple, durable and reliable in construction and effective and efficient in operation.

Other objects of my invention will appear hereinafter.

My invention consists in the features of novelty exemplified by the construction, combination and arrangements of parts hereinafter described, shown in the accompanying drawings, and more particularly set forth in the appended claims.

Referring to the accompanying drawings:

Figure 1 is a top plan view of a pulping machine embodying my invention.

Fig. 2 is a vertical central section of the structure shown in Fig. 1.

Fig. 3 is a partial vertical section on the line 3—3 of Fig. 1, the drum being shown in elevation.

Fig. 4 is a transverse sectional view on the line 4—4 of Fig. 3.

Fig. 5 is a transverse sectional view on the line 5—5 of Fig. 2.

Fig. 6 is a transverse section on the line 6—6 of Fig. 2.

Fig. 7 is a fragmentary view of a portion of the drum showing spirally disposed instead of tapered ribs.

It has been the practice in pulping fruits and vegetables to crush or press or literally beat the whole fruit or vegetable in order to recover the desirable parts of the solid and fluid contents thereof, and separate therefrom the refuse or undesirable portions, such as stems, seed and skins. But these methods are wasteful, the resulting pulp non-uniform in character, extremely slow and in fact highly inefficient. Where beating is employed a large proportion of desirable pulp remains with and is thrown away with skin and seeds as refuse because of the inherent inability of this method to recover all of the pulp. In the pressing or crushing methods the pressure cannot be sufficient to squeeze out all the pulp without also crushing the stems and seeds and thereby affecting the flavor of the pulp. On the other hand, if the pressure is such as to avoid crushing seeds and stems it is insufficient to obtain all of the pulp and hence results in considerable waste. My invention is designed to avoid these objections and to improve the method of and apparatus for pulping fruits and vegetables in a highly efficient manner, from the standpoint not only of avoiding waste but of uniformity of product and elimination of seeds and stems and the flavors thereof. My purpose also is to materially increase the pulp output; in fact to recover all of the pulp and leave nothing but dry refuse. It will be obvious, however, to one skilled in the art after having obtained an understanding of my invention from the disclosures herein made, that the principles and functions of my invention are applicable to various uses and applications in the reduction or production of pulp from fruits and vegetables, and the structure shown in the drawings is intended to illustrate the application of these principles and functions.

The structure shown in the drawings is vertically disposed so as to occupy a minimum amount of floor space. It has a cylindrical hollow casing or shell A which is supported by a frame consisting of a base member or plate B and four legs $B^1$ connected at their lower ends by cross bars $B^2$ to prevent spreading of the legs and give rigidity to the structure. This shell or casing forms a container for the internal working parts and also as a splash board and collector for the pulp. The pulp or juice of course falls or settles to the bottom of the casing and drains off through a suitable opening $A^1$ in the base member B, this base member forming the bottom of said casing. This bottom member has two concentrically disposed flanges $B^3$. The outer flange forms a shoulder against which the bottom edge of the casing A is removably positioned and the casing is held in place by a similarly flanged clamping ring $B^5$ removably positioned at the upper edge of the shell or casing. This clamping ring is retained by a number of vertical rods $B^6$ extending through lugs $B^7$ projecting from the base member and clamping ring. Clamping nuts are screwed onto the end of these rods for applying suitable clamping pressure. Thus a structure is provided which may be completely disassembled for the purpose of thoroughly cleaning the parts and for repairs. The upper end of the casing is provided with a suitable cover member D which is hinged at $D^1$ to the upper frame ring $B^5$ so that the cover may be raised and lowered to provide access to the interior of the mechanism. This cover, as shown clearly in Fig. 2, is clamped in its closed position by several clamping bolts and nuts $D^2$, these bolts being pivoted at $D^3$ to lugs on the frame ring $B^5$ and operate in forked or slotted projections on the edge of the cover member. The cover member has a substantially triangular opening $D^4$ through which the material to be pulped is fed, a hopper $D^5$ being mounted on the cover and communicating with this opening. Within the casing and spaced from the wall thereof is a cylindrical concentrically disposed separator or sorting screen E which is open at both ends. The lower end is removably supported on and retained in place against the shoulder formed by the inner flange $B^3$ of the base member, the screen being disposed against the inner side of the flange so that the flange will resist any tendency to distortion of the screen under the strains to which it is subjected. The upper end of the screen fits within and is held in place by means of an annular groove $E^1$ in the under surface of the cover member. Thus the screen or separator is firmly held in place and rendered rigid and strong. However, it may be very readily removed for cleaning or other purposes. The cover member when raised releases the separator member and permits it to be lifted directly out of the casing. The separator is, of course, of the proper mesh or provided with the proper sized openings to serve the purpose of any particular conditions under which the machine is operated. In fact the purpose in making the screen so readily removable is to enable screens or separators having various sized mesh or openings to be used for these particular conditions. Its function is to separate the refuse or residue from the desirable portions or pulp. In fact it permits all of the desirable pulp matter to pass through and restrains the passage of the skin, seeds and stems. A drum G is positioned within this screen. This drum is cylindrical in shape and preferably hollow so as not to make it unduly heavy. It is concentrically disposed within but spaced from said screen or separator. The drum is completely closed at both ends by means of the upper and lower heads $G^1$ which are preferably cast integrally therewith. These heads also have central hubs for a vertical shaft H upon which the drum is fastened and by which it is rotated. The lower end of the shaft is journaled in a bearing $G^2$ formed in the center of the base member B and between the lower drum head $G^1$ and this bearing $G^2$ includes a plurality of bearing rings $G^3$ for the purpose of reducing the relative speeds between the respective surfaces and thereby reduce the wear. This bearing and the bearing rings are large and substantial so as to properly withstand the comparatively high speeds at which the drum is rotated. The upper end of the shaft has a socket $H^1$ in which fits the reduced end of a screw or bolt $H^2$ in the cover member, the central portion of the cover member being provided with an upstanding boss to provide a long hole or opening into which the screw is threaded and in which it is adjustable. This forms a substantial upper bearing which is separable from the shaft when the cover is raised. The drum is preferably carefully balanced so as to avoid all vibrations incident to the comparatively high speed at which it is rotated. In this structure the rotation is imparted to the drum shaft by means of a set of miter gears J disposed beneath the bottom member of the frame. One of the gears is fastened to the lower end of the shaft H and the other gear is fastened to a horizontal shaft $J^1$ which is journaled in suitable bearings formed in the legs $B^1$ of the frame. At its outer end this shaft carries a large pulley $J^2$ which may be driven from any suitable source of power through the medium of a belt. The upper head of the drum is spaced below the cover member and in this space is located a circular plate or member L of the same diameter rotated by and at the same speed as the drum, the driving connection between the plate and drum being formed by a shear pin $L^1$ which is inserted through suitable openings in both the plate and the head of the drum. This acts as a safety device to prevent injury or damage to the machine in the event that a nail or piece of stone should accidentally be fed into the machine as is often the case in handling large quantities of fruits and vegetables to be pulped. In the event that this foreign substance should lock or jam the plate or bind it in any manner, so as to prevent its rotation, the shear pin will give way and permit the plate to remain idle although not interfering with the rotation of the drum. The plate has on its upper side a series of cutters or ribs M which in this structure are radially disposed and substantially rectangular in cross section. These ribs extend from the hub beyond the periphery of the plate, and when rotated at a completely high rate of speed, pass beneath the hopper opening in the cover and operate as knives or cutters to chop up or finely cut the fruit or vegetables fed into the machine. The centrifugal force applied by reason of the rotation to this comminuted material instantly throws it to the periphery of the plate where it passes into the space between the drum and the separator screen. The material works downwardly between the separator screen and the periphery of the drum, this action being brought about by two influences, one of which is gravity and the other of which is a plurality of tapered ribs G⁵ longitudinally disposed on the surface of the drum. These ribs being slightly tapered downwardly, operate to gradually move the body of material downwardly during the rotation of the drum. These ribs, however, instead of being tapered may be spirally or angularly disposed on the drum for this purpose, as shown in Fig. 7. These ribs are preferably equally spaced apart at a distance equal to the spacing of the ribs M at the periphery of the plate so that they will coincide with the cutter ribs M and in a sense constitute continuations of the cutter ribs M down along the surface of the drum. These ribs preferably just clear the inner surface of the separator screen avoiding actual contact with said separator screen but they form, in a sense, cells or pockets on the periphery of the drum in which cells the material is retained so that the rotation of the frame also imparts rotation to the material. As the material moves downwardly along the drum the intense centrifugal force exerted on this material operates to violently throw the material from the surface and through the separator member. The separator, however, retards the stems, skin and seeds and the effect of the centrifugal force is to remove all of the pulp and juice leaving nothing but the skin, stem and seeds in a remarkably dry condition. This refuse gradually works down into the space between the drum and screen and drops into a chamber N formed in the base member B. The refuse is finally discharged through an opening N¹ in the wall of this chamber. A suitable funnel or chute N² may be used to convey the refuse wherever desired. The chamber N is kept clear of refuse by means of a vane N³ carried by the lower drum head and which operates to sweep around the chamber and carry all refuse toward the discharge opening N¹. In order to keep the separator clean and prevent any of the refuse, and particularly the skins of the fruit or vegetables from clinging thereto, I provide a series of longitudinal brushes P on the drum which are adapted to sweep around the interior surface of the separator during the rotation of the drum. In this structure I provide two groups of these brushes positioned diametrically opposite on the drum. These extend preferably longitudinally of the drum and are preferably removable for renewal or cleaning. In this case the bristles are carried in a suitable backing P¹ which may be removably dovetailed in correspondingly formed longitudinal grooves in the surface of the drum for this purpose.

I claim:

1. The combination of a separating member, a rotary mechanism having carriers for bodily rotating the material to centrifugally force it through said separating member, and a crusher rotating with said rotary mechanism for supplying the material outwardly to said rotary mechanism in a finely divided state.

2. The combination of a cylindrical perforate separator screen, a rotary drum positioned within said screen and having an imperforate surface spaced concentrically from said screen for bodily carrying the material and centrifugally forcing the material through said screen, crushing mechanism for crushing the material and feeding it outwardly to the space between the drum surface and screen, and a casing outside of said screen for collecting the pulp passing through the screen.

3. The combination of a cylindrical foraminous separator screen, a rotary drum positioned within and spaced circumferentially from said screen for centrifugally forcing the material through said screen, means at the upper end of the drum for crushing the material and feeding it to the space between the drum and screen, a casing for collecting the pulp passing through the screen, and means for cleaning the screen.

4. The combination of a rotary drum having means arranged to carry the material bodily with the drum and subject the material to the action of centrifugal force, a crusher at the upper end of the drum for supplying material to said drum, a separator embracing said drum and arranged to retard a portion of the material and to permit the passage therethrough of the remaining portion of the material thrown from said rotary drum, and means carried on the periphery of the drum for wiping the separator to remove said remaining portion.

5. The combination of a rotary cylinder, a separator screen concentric with and spaced from the periphery of said drum, means on the periphery of the cylinder operating in the space between the cylinder and screen to carry the material bodily with the cylinder and impart centrifugal action to the material, crushing mechanism on the upper head of the drum for finely dividing the material and feeding it to the peripheral carrying means on the cylinder.

6. A machine for separating the juices and pulp of crushed food products comprising a cylindrical screen, a rotary cylinder disposed within and concentric with respect to the screen to provide an annular space between its periphery and the screen, the opposed surfaces of the cylinder and screen being longitudinally straight, means for feeding said material to said annular space, and longitudinally extending means on the periphery of the cylinder adapted to retain work material on the periphery of the cylinder against relative rotation whereby the material is bodily rotated with the cylinder to impart centrifugal force thereto for causing portions of the material to pass through the screen, said centrifugal force being uniform throughout the extent of the cylinder.

7. The combination of an upright cylinder having a plurality of substantially longitudinal channels on its periphery wherein to carry the material rotarily with the cylinder, a screen concentrically disposed with respect to said cylinder, for restricting portions of the material against centrifugal action and permitting other portions to pass through the screen, a hopper, substantially radial ribs on the upper end of said cylinder for radially distributing the material to the peripheral channels of said cylinder.

8. The combination of an upright cylinder screen, a rotary cylinder substantially fitting within said screen and having a plurality of substantially longitudinal channels on its periphery for rotatively carrying the material, but in which the material may move downwardly by gravity, a casing inclosing said screen and forming a splash board for the liquids which pass through said screen, a cap member spaced from the upper end of the cylinder and having a feed opening, a plurality of substantially radial ribs moving with the cylinder and substantially fitting the space between said cylinder and cap member for comminuting the material which enters the opening and distributing said material by centrifugal force to the cylinder channels, and means at the lower end of the casing for separately collecting the liquids and refuse.

9. The combination of an upright cylinder screen, a rotary cylinder substantially fitting within said screen and having a plurality of substantially longitudinal channels on its periphery for rotatively carrying the material but in which the material may move downwardly by gravity, a casing inclosing said screen and forming a splash board for the liquids which pass through said screen, a cap member spaced from the upper end of the cylinder and having a feed opening, a plurality of substantially radial ribs moving with the cylinder and substantially fitting the space between said cylinder and cap member for comminuting the material which enters the opening and distributing said material by centrifugal force to the cylinder channels, means at the lower end of the casing for separately collecting the liquids and refuse, and wipers on the periphery of said cylinder for cleaning the screen.

10. A machine for separating the juices and pulp of crushed food products comprising a casing, an upright stationary cylindrical screen in the casing and secured at its ends thereto, a rotary cylinder disposed within and concentric with respect to the screen to provide an annular space between its periphery and the screen, means for feeding material to said annular space, and means on the cylinder engageable with material in the annular space to retain the material on the periphery of the cylinder against relative rotation whereby the material is bodily rotated with the cylinder to impart centrifugal force to the material for causing portions thereof to pass through the screen under centrifugal force.

11. The combination of a stationary upright cylindrical screen and an upright rotary drum disposed concentrically within said screen, and having on its periphery a plurality of upright channels for bodily carrying the material rotatably with the drum said channels being arranged so that the material moves downwardly therein as the drum rotates, a crushing and feeding device horizontally disposed at the upper end of said drum for crushing the material and centrifugally feeding it to the upper ends of said channels, and a casing surrounding said screen.

12. The combination of a stationary upright cylindrical screen, and an upright rotary drum disposed concentrically within said screen and having on its periphery a plurality of channels for carrying the material rotatably with the drum in close proximity to said screen said channels being arranged so that the material moves downwardly therein by gravity as the drum rotates, a crushing device embodying a plurality of radial ribs on the upper head of the drum acting to crush the material and distribute it to the upper ends of the channels, and a cylindrical upright casing surrounding said screen.

13. A centrifugal crusher and separator comprising an outer casing, a cylindrical screen therein, a cylindrical member within said screen and spaced therefrom, a centrifugal feeding device at one end of said cylindrical member adapted to receive and crush material and feed the same to the periphery of the cylinder and means upon said cylindrical member operative to carry said material and centrifugally move the same forward through said screen.

14. The combination of a separating member, a rotary mechanism having carriers for moving the material in juxtaposition to said separating member for separating the material, and a crusher rotating with said rotary mechanism for crushing the material and supplying said crushed material radially outwardly to said rotary mechanism.

15. The combination of a separating member, a rotary mechanism having carriers for moving material in juxtaposition to said separating member for separating said material, and a crusher rotating with said rotary mechanism and disposed radially inwardly of the receiving portions of the carriers for crushing the material and supplying said material by said centrifugal action to the carriers.

16. The combination of a separating member, a rotary crusher disposed above the separating member, and carriers extending from the periphery of the crusher and being adapted to receive work material directly from the crusher, said crusher being rotatable therewith for moving material in juxtaposition to the separator for separating said material.

17. The combination of a stationary separating screeen, a rotary crusher disposed above the separating screen, and carriers extending from the periphery of the crusher and being adapted to receive work material directly from the crusher, said crusher being rotatable therewith for moving material in juxtaposition to the separating screen for separating said material.

Signed by me at Chicago, Illinois, this 31st day of January, 1917.

CLARENCE E. STEERE.